United States Patent [19]

Varnau

[11] Patent Number: 5,158,487

[45] Date of Patent: Oct. 27, 1992

[54] POSITIONING FIXTURE

[75] Inventor: Bernard T. Varnau, Cincinnati, Ohio

[73] Assignee: Proprietary Main, Inc., Cincinnati, Ohio

[21] Appl. No.: 487,589

[22] Filed: Mar. 2, 1990

[51] Int. Cl.⁵ .................................. B23Q 3/06
[52] U.S. Cl. ..................... 29/33 P; 269/902; 409/219
[58] Field of Search ............... 409/219, 221, 222, 163, 409/164; 29/38 A, 38 B, 38 C, 563, 564, 33 P; 198/803.01, 803.7, 803.3, 345.2, 345.3, 346.1, 346.2, 346.3; 269/138, 303, 43, 26, 25, 902, 47, 86; 279/1 R, 9 R, 1 DC, 14

[56] References Cited

U.S. PATENT DOCUMENTS

| | | | |
|---|---|---|---|
| 839,740 | 12/1906 | Embler et al. | 29/38 B |
| 2,651,832 | 9/1953 | Menard et al. | 29/38 B |
| 3,385,138 | 5/1968 | Wustent et al. | 29/38 C X |
| 3,598,392 | 8/1971 | Williamson | 269/47 |
| 3,899,162 | 8/1975 | Fischer | 269/25 |
| 4,103,589 | 8/1978 | Francis | 409/221 |
| 4,485,911 | 12/1984 | Cameron | 198/345.3 |
| 4,489,929 | 12/1984 | Blechschmidt | 269/282 |
| 4,508,326 | 4/1985 | Andre | 269/152 X |
| 4,529,183 | 7/1985 | Krason | 269/43 |
| 4,537,389 | 8/1985 | Kancnik | 269/238 X |
| 4,585,217 | 4/1986 | Erickson | 409/219 X |
| 4,614,469 | 9/1986 | Beere et al. | 409/219 |
| 4,643,411 | 2/1987 | Izumi | 269/138 X |
| 4,662,043 | 5/1987 | Stone et al. | 198/345.3 X |
| 4,678,077 | 7/1987 | Bertorello | 198/345.3 X |
| 4,685,661 | 8/1987 | Slocum et al. | 269/25 X |
| 4,711,437 | 12/1987 | Longenecker | 269/303 X |
| 4,794,686 | 1/1989 | Moore | 29/568 |
| 4,921,378 | 5/1990 | Kytölä | 409/221 |

FOREIGN PATENT DOCUMENTS

| | | | |
|---|---|---|---|
| 2332173 | 1/1974 | Fed. Rep. of Germany | 29/38 R |
| 266761 | 4/1989 | German Democratic Rep. | 269/86 |
| 115491 | 9/1979 | Japan | 409/219 |
| 216645 | 9/1988 | Japan | 269/86 |

OTHER PUBLICATIONS

"Keys to Machining Center Palletization", K. Gettelmen, pp. 61-64, *Modern Machine Shop*, Mar. 1982.

*Primary Examiner*—William Briggs
*Attorney, Agent, or Firm*—Porter, Wright, Morris & Arthur

[57] ABSTRACT

The present invention is a fixture primarily for use with a machining center. The fixture has a plurality of face plates mounted on an interior casing and moveable jaws exposed on the face plates. Parts to be machined can be placed between the jaws and gripped by the jaws for easy and quick setup of various machining operations. Assemblies for actuating the jaws are described.

16 Claims, 5 Drawing Sheets

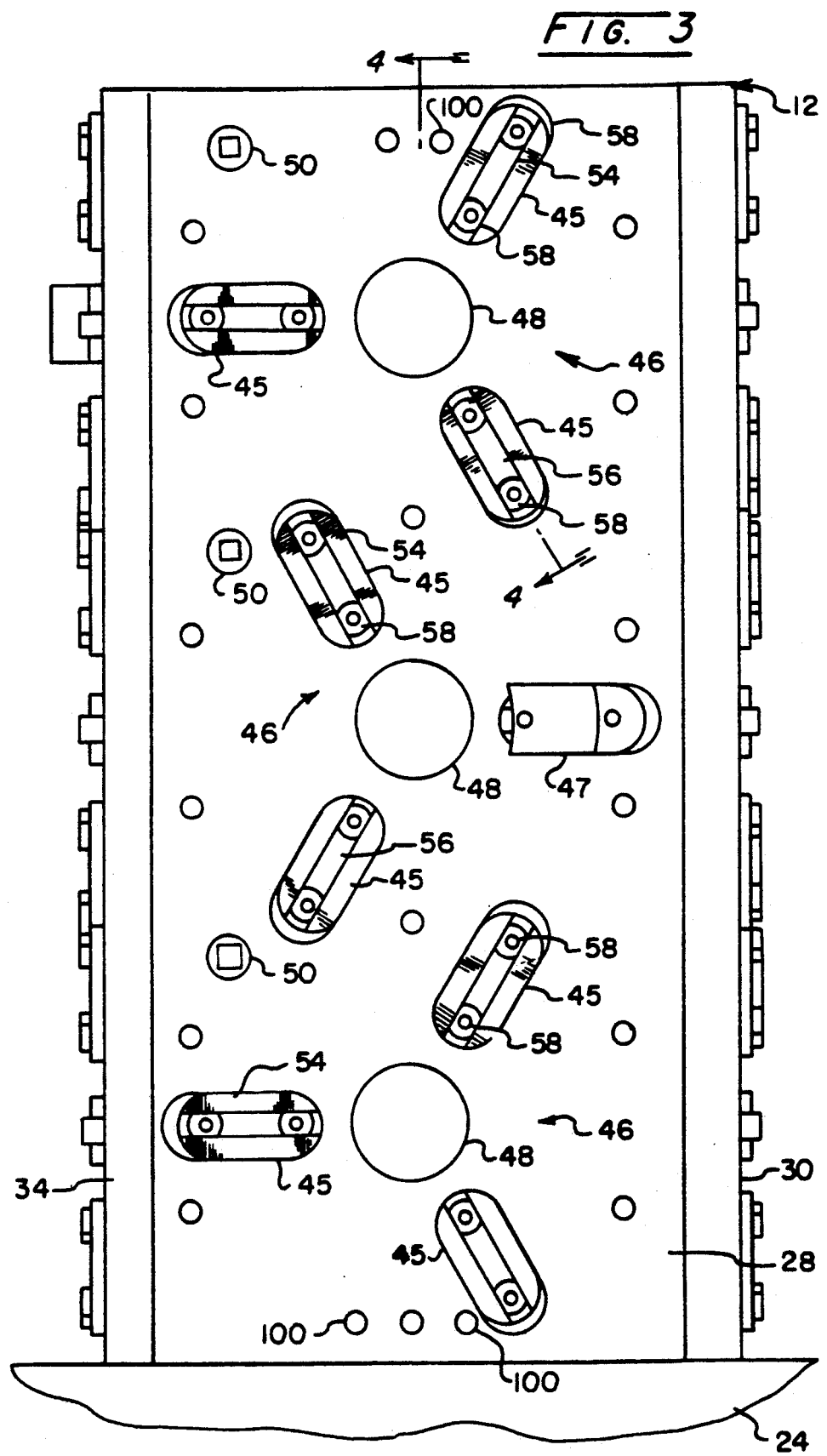

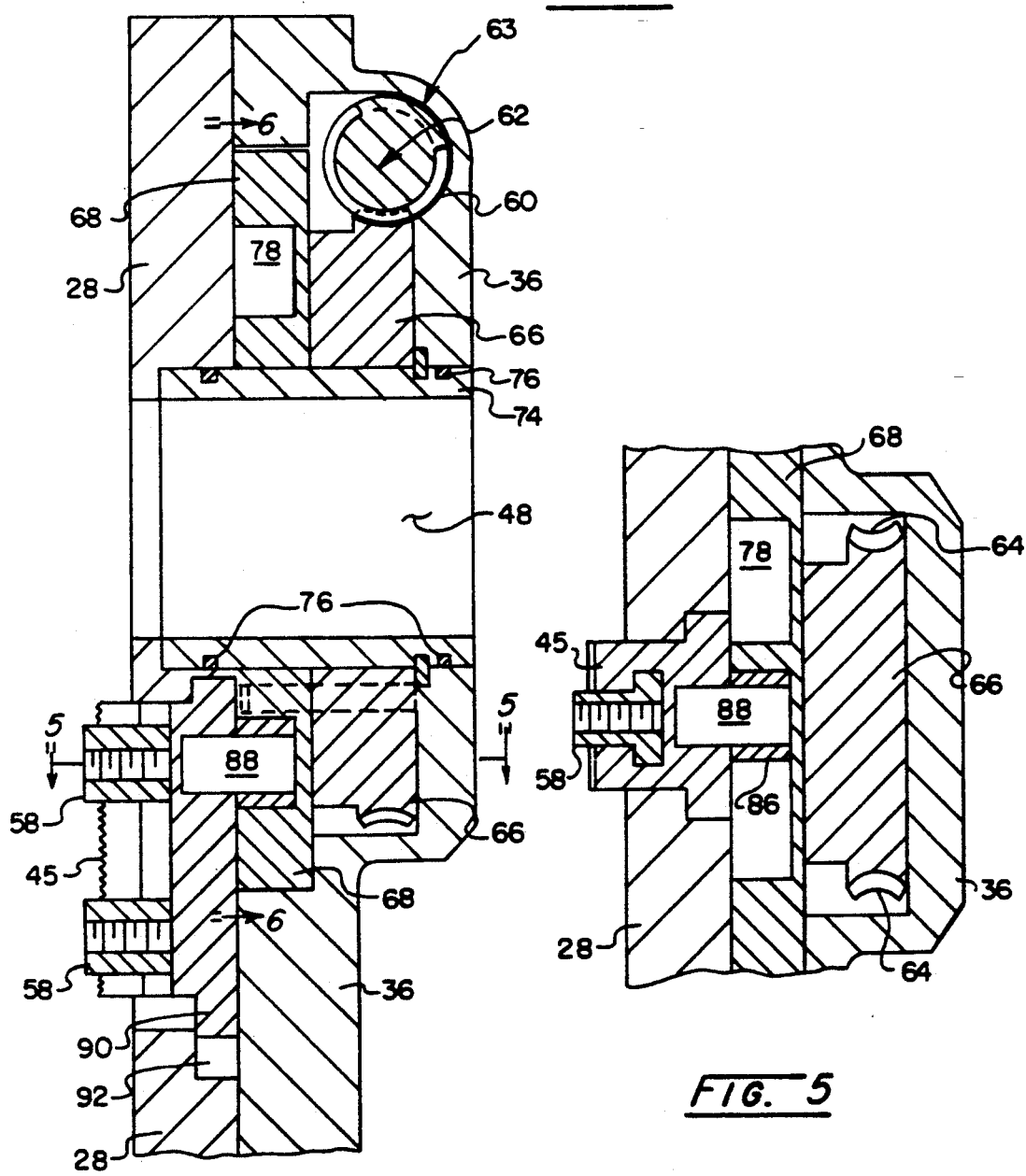

POSITIONING FIXTURE

BACKGROUND AND SUMMARY OF THE INVENTION

This invention relates to a fixture for use in machining applications, and more particularly to a positioning fixture block having moveable jaws for use with machining centers.

During machining operations downtime is a crucial problem that occurs daily at almost every manufacturing facility. Emphasis is placed on limiting the amount of time which the machining center sits idle due to the operator setting up the job and verifying the operation. The object is to reduce downtime thereby increasing productivity.

It is an object of the present invention to dramatically reduce downtime for setup and re-verification while improving both the quality and quantity of the output. It is a further object of this invention to provide a machining fixture that offers consistent part-locating centerlines to simplify and speed-up part programming times.

It is yet a further object of this invention to provide a fixture for use with large lot runs and for runs having a mix of parts with different sizes, shapes, shafts and flanges which may be run at the same time on the same fixture block or cube. This would allow an end user to run a family of parts at one time in one setup aiding the "just-in-time" concept of modern day machining.

One advantage of the fixture block of the present invention is that it cuts the time and risk of error in setups and reverification. Large lot runs and reruns are possible with greater speed and accuracy. In one preferred embodiment of the present invention, twelve various parts can be run at the same time on the same fixture to save changeover time. Another advantage of the present invention is that setup can usually be completed in just a few minutes and no reverification is needed on previous setups. The fixture of the present invention is available in any number of chucks and arrangement of chucking dimensions and/or chuck capacity diameter.

In a preferred embodiment, each fixture is supplied with twelve complete sets of movable jaws which are built to hold close tolerances for years of accurate service. Three sets of jaws are secured to each of four side walls of the fixture. Of course, the number of jaw sets can vary depending on the user's needs. Either hard or soft work jaws may be used. The work jaws may be arranged to sit in a standard ninety degree serrated face master jaw which enables different jaws to be incorporated that are available from most jaw manufacturers. The fixture features welded steel or cast construction and may be designed to permit through-the-cube chucking of shafts. The use of soft jaws enables the user to custom machine the jaw locating faces to his own needs right on the machining center. Downtime is further reduced by using the fixture of the present invention on each pallet of a machining center so that idle pallets can be setup while another pallet is running.

BRIEF DESCRIPTION OF THE DRAWINGS

The foregoing and other objects and advantages will become more apparent when viewed in light of the accompanying drawings and the following description wherein:

FIG. 3 is a front elevational view of one face plate of one embodiment of the fixture of the present invention;

FIG. 4 is a section view taken in the direction of arrows 4—4 in FIG. 3;

FIG. 5 is a section view taken in the direction of arrows 5—5 in FIG. 3;

DESCRIPTION OF PREFERRED EMBODIMENTS

Figure 1:
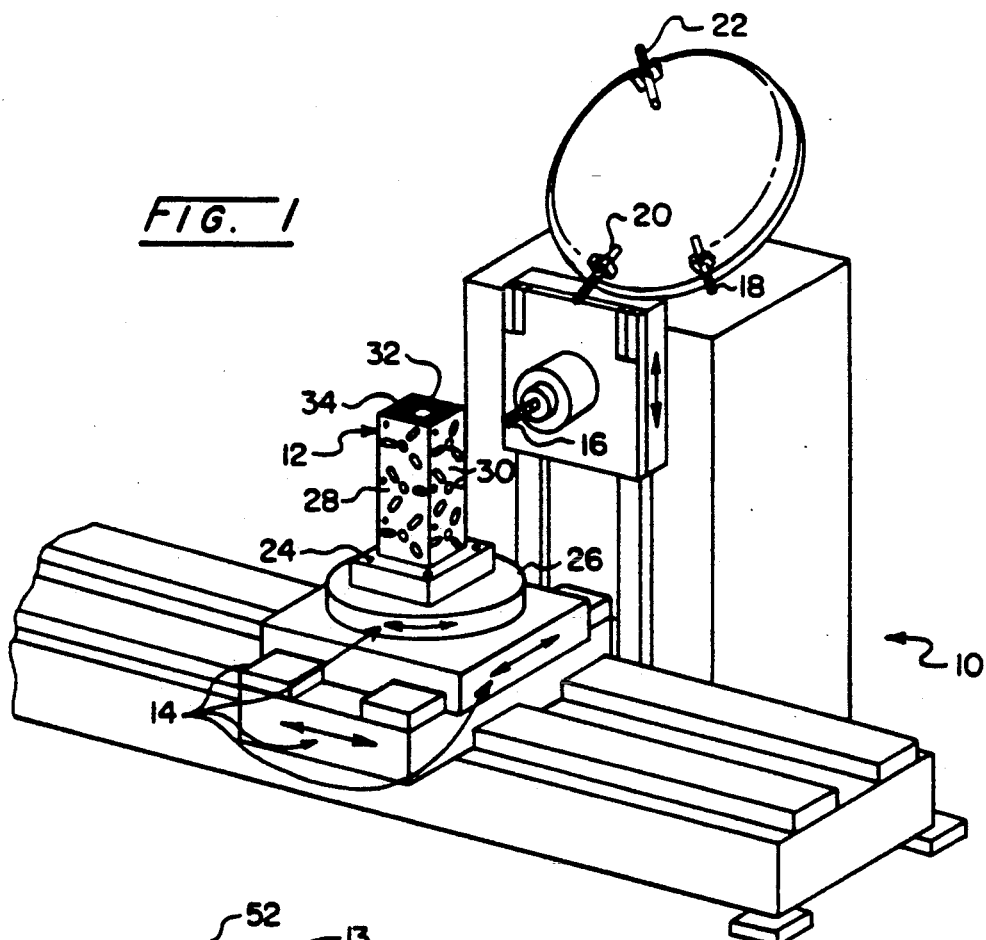
FIG. 1 is a perspective view of one embodiment of a fixture of the present invention in association with a horizontal machining center.

Referring now to the drawings, there is illustrated a horizontal machining center 10 having a positioning fixture of the present invention, generally indicated at 12, for use therewith. Various parts which are to be machined are secured to the fixture cube 12 then the fixture 12 may be moved along an axis 14 until it reaches the cutting tool 16. The machining center 10 may be automated to enable tool 16 to be automatically exchanged for other tools 18, 20, 22. The fixture 12 is secured to a base 24. The base 24 is secured to an indexing member 26 which can rotate to expose each face 28, 30, 32, 34 of the fixture 12 to the cutting tool 16.

Figure 2:
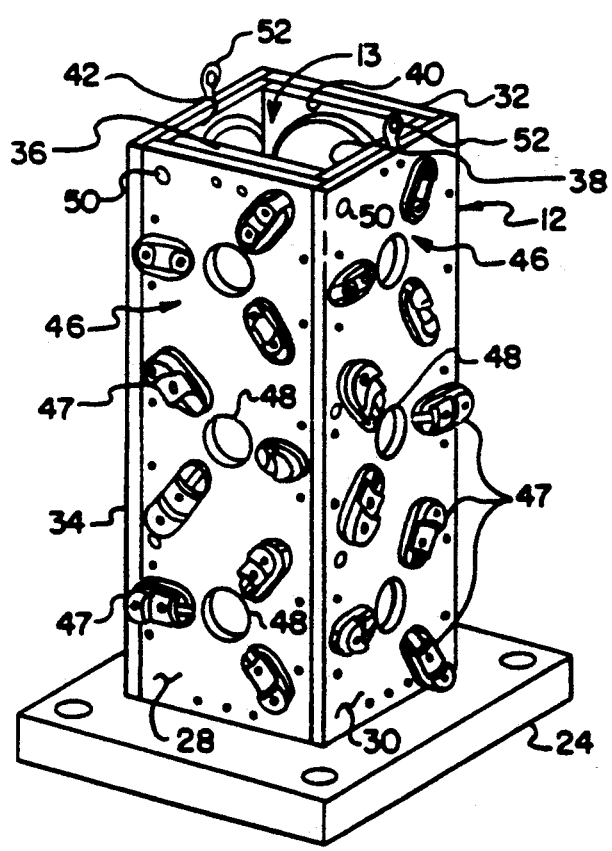
FIG. 2 is a perspective view of one embodiment of the fixture of the present invention.

In a preferred embodiment, as shown in FIG. 2, the fixture cube 12 includes a casing 13 having four inside steel plates or side walls 36, 38, 40, 42 welded together. Four steel face plates 28, 30, 32, 34 at ninety degrees to each other are bolted to the inside plates 36, 38, 40, 42 respectively so that the face plates 28, 30, 32, 34 fit flush against the inside plates 36, 38, 40, 42. The cube 12 may then be secured to a base member 44 which will be used to secure the cube 12 on the machining center 10. Along each face plate 28, 30, 32, 34 three sets of jaws 46 may be provided for gripping parts to be machined.

Also shown in FIG. 2 are the through holes 48 at the center of each set of jaws 46 that provide clearance for shaft type parts. The through holes 48 pass from the face plates 28, 30, 32, 34 through the inside plates 36, 38, 40, 42 and may be aligned in such a way that allows a shaft to pass all the way through from one face plate, such as face plate 28, through the inside of the cube 12 and out the other side of face plate 32. Not every part would need this feature, but it is a benefit which may be useful from time to time.

In one embodiment the jaws 46 may be actuated by the operator through tool insert holes 50. One tool insert hole 50 is provided for each set of jaws 46. The actuation for the jaws 46 will be described more thoroughly hereinafter. Lastly, in FIG. 2, eye bolts 52 may be secured to the top portion of the fixture 12 to assist in the lifting of the fixture 12 on to the machine center 10. Due to the construction of the fixture 12 of the present invention, the weight of the fixture 12 may be very heavy which may require some type of mechanical assistance to lift the fixture 12 onto the machine 10. Chains or straps could be passed through the eye bolts 52 and used in conjunction with a mechanical lifting mechanism.

Referring now to FIG. 3, a typical face plate 28, is shown for the fixture block 12 of the present invention. For easier understanding, only one side of the fixture 12 will be explained. Referring to the three sets of jaws 46, they will now be explained in greater detail. Each set of jaws 46 is comprised of at least three chuck master jaws 45 having a serrated face 54 and a T-slot 56. Positioned within the slots 56 of the master jaws 45 are two or more T-nuts 58. Work jaws 47 are positioned on the serrated face 54 of the master jaws 45 and secured by bolts passing through the work jaw 47 and down into the T-nuts 58. The T-nuts 58 can slide inside the slot 56 so that the work jaw 47 can be arranged on the master jaw 45 in various distances from the through hole 48.

Before further describing the present invention, it is important to note that many variations of the invention could be incorporated. For example, more or less than three sets of jaws 46 could be in place on each face plate 28, 30, 32, 34. Secondly, the fixture block 12 does not necessarily have to be a cube shape. It could have three sides, four, five, six sides or more. Each set of jaws 46 could include more than three master jaws 45. The four inside plates, 36, 38, 40, 42 could also be formed from one block of steel or casting which would eliminate the need for welding individual inside plates.

Figure 6:
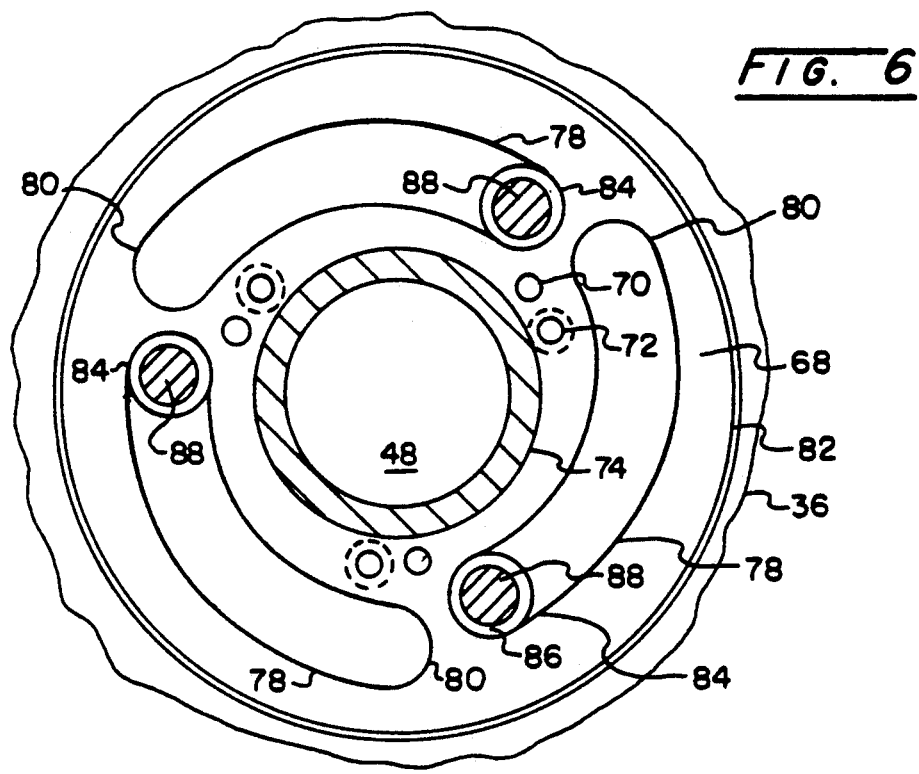
FIG. 6 is a section view taken in the direction of arrows 6—6 in FIG. 4.

Referring now to FIGS. 4, 5, and 6, there is shown the inner workings to actuate the master jaws 45. Inside the tool inserts 50, there is a worm drive passageway 60 which houses a worm gear 62. As a tool is inserted into the tool insert 50 and engages the worm drive gear 62, the worm drive gear 62 will turn within the passageway 60. The worm drive gear 62 makes contact with a worm track 64 on a worm wheel 66. The worm wheel 66 is connected to a scroll plate 68 by dowel pins through dowel pin holes 70 in the scroll plate 68 and worm wheel 66. Bolts passing through bolt holes 72 in the scroll plate 68 and the worm wheel 66 will tightly secure the two together. Therefore, as the worm wheel 66 turns, the scroll plate 68 will turn with it. A bearing sleeve 74 is provided in the through holes 48 which pass through both the scroll plate 68 and the worm wheel 66. 0-ring seals 76 may be provided around the bearing sleeve 74 for sealing out foreign material from passing through any small openings between the outer face plate 28 and the inside plate 36.

The scroll plate 68 may have three somewhat elliptical shaped slots 78 formed in a side thereof. The exact number and shape of the slots 78 could vary somewhat and still fall within the scope of this invention. In one preferred embodiment there is an equal number of slots 78 to go with jaws 45. Each slot 78 begins at one end 80, a particular distance from the perimeter 82 of the scroll plate 68. The slots 78 descend toward the center of the scroll plate 68 in such a manner that another end 84 of the slots 78 are a further distance away from the perimeter 82. In a preferred embodiment, the difference between the distances from one end 80 to the perimeter 82, and the other end 84 and the perimeter 82, may be one quarter inch. Of course, this difference can be more or less than one quarter inch depending on how much jaw movement is preferred. Inside each slot 78 is a roller bushing 86 and one end of a pin 88 which may be made of hardened steel. As the scroll plate 68 turns, the pins 88 and roller bushings 86 will move within the slots 78. While one end of the pins 88 resides in the slots 78 of the scroll plate 68, the other end of the pins 88 is secured within a portion 90 of master jaws 45. As the scroll plate 68 turns, the scroll pin 88 will move in or out, with respect to the center of the through hole 48, depending upon the direction of rotation of the scroll plate 68. As the pin 88 moves in or out with respect to the through hole 48, the pin 88 will force the master jaw 45 to move within a slot 92 of face plate 28. Work jaw 47 will be secured to master jaw 45 by bolts threaded into teenuts 58 and as the scroll plate 68 is turned by the worm wheel 66 the work jaws 47 will either tighten around the part to be machined or the work jaws 47 will loosen from the part so that it may be removed from the fixture cube 12.

Figure 7:
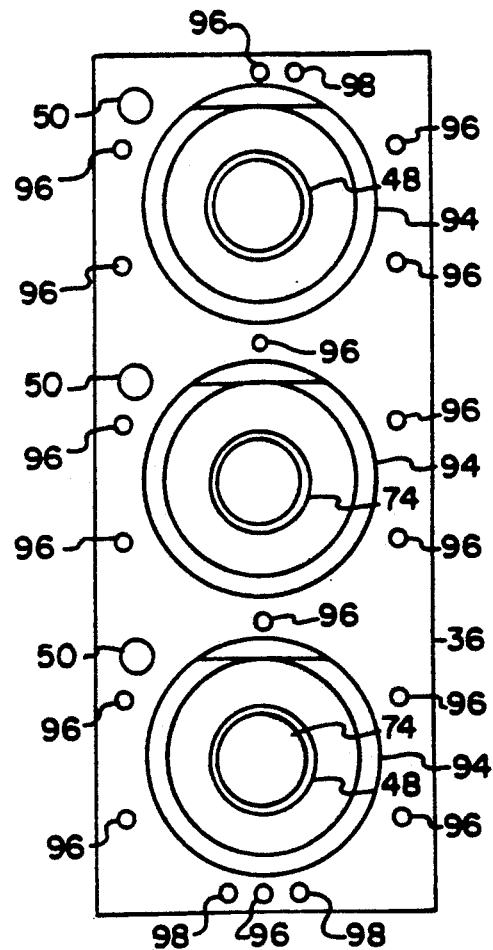
FIG. 7 is a front elevational view of an inside plate of one embodiment of the fixture of the present invention.

Referring to FIG. 7, a typical inside plate 36 is shown. Center holes 94 house the scroll plates 68 and worm wheels 66. A plurality of bolt holes 96 are located around each center hole 94 for securing inside plate 36 to face plate 28. Alignment holes 98 are provided to locate the position of the face plate 28 with respect to the inside plate 36 to maintain accuracy and the concentricity of the jaws 45 with respect to each chuck centerline. The face plate 28 will have matching alignment holes 100 so that dowel pins may be inserted through these holes 98, 100 to align the face plate 28 with the inside plate 36 before bolts secure the two plates 28, 36, together.

The work jaws 47 are commercially available from many sources known to those of ordinary skill in the art. In one embodiment described above, the master jaws 45 are actuated manually by a tool to turn the worm gear drive 62. In another embodiment, the jaws 45 could also be actuated by electrical or hydraulic means.

Figure 8:
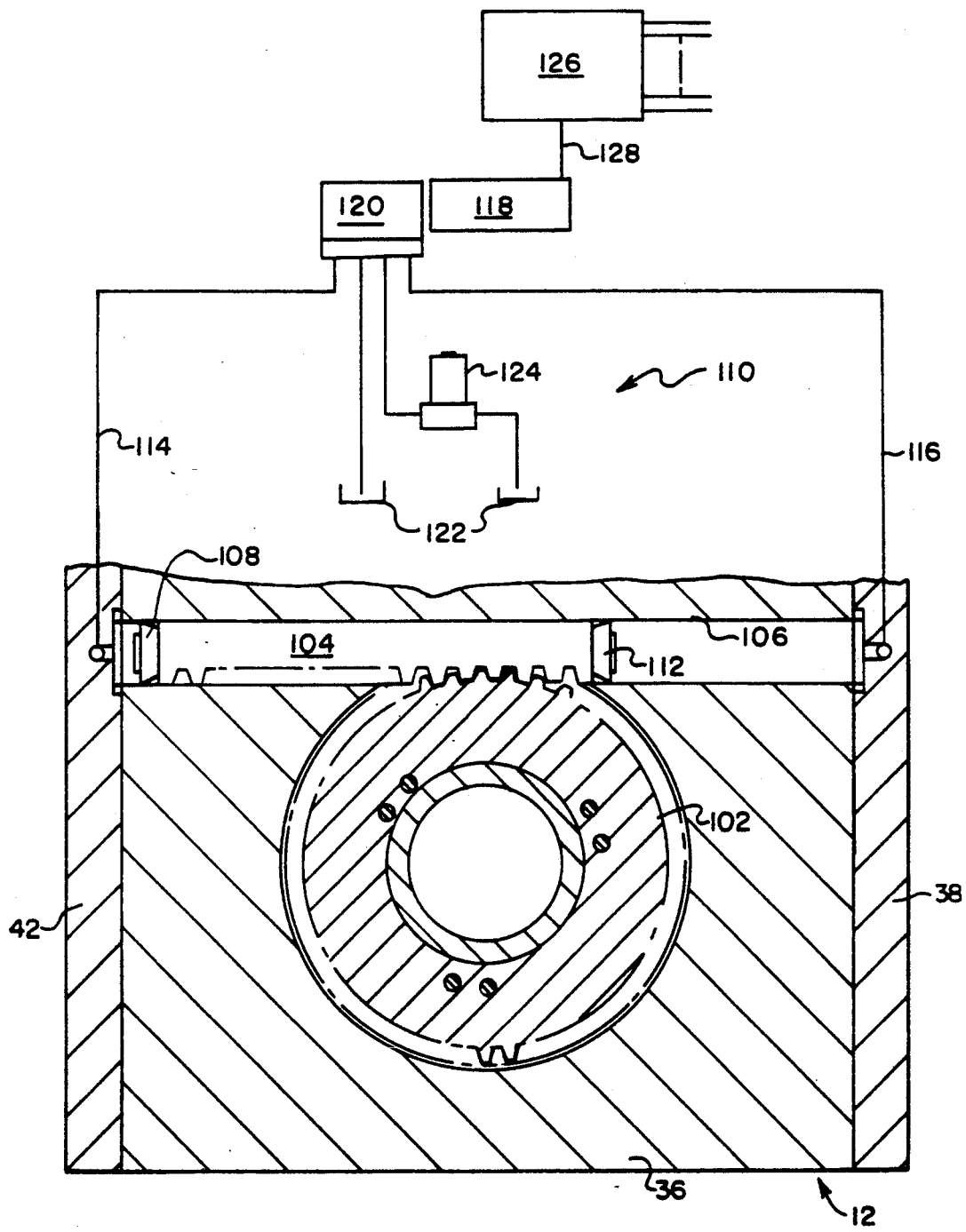
FIG. 8 is a partial schematic, partial cutaway view of another embodiment of the present invention.

In FIG. 8, a typical inside plate 36, is shown in conjunction with another embodiment for the fixture block 12 of the present invention. This embodiment comprises a hydraulic system 110 and works the same as that described above and shown in FIG. 3, except for the manner in which the scroll plate 68 is turned. Instead of having a worm wheel 66, there is a spur gear 102 secured to the scroll plate 68. And, instead of a worm gear 62, there is a rack drive gear 104 inside a hollowed out section 106 of inside plate 36.

The rack drive gear 104 has a floating piston 108, 112 at each end thereof. Hydraulic lines 114, 116 supply fluid into the hollowed out section 106 to apply pressure against either one of the pistons 108, 112 to move the rack 104 linearly in either direction.

The hydraulic lines may be connected to a valve 118 that controls which hydraulic line 114, 116 is pressurized with fluid. A fluid compartment 120 in fluid communication with a fluid reservoir 122 along with a pressure pump 124 control pressure in the hydraulic lines 114, 116. The valve 118 can be electronically controlled at a control box 126 which may have a manual override feature. The control box 126 has a wire 128 to the valve 118 and sends a signal to switch the valve 118 to allow fluid to flow into a selected hydraulic line 114, 116. Each set of jaws 46 could have such an arrangement and all valves 118 could be controlled at one control box 126 by an operator.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A fixture for use in holding parts to be machined, said fixture comprising: at least three side walls joined in a manner forming a casing; an equal number of face plates as there are side walls, each of said face plates secured to the exterior surface of each of said side walls; of least one set of movable jaws built into at least one of said face plates, said set of movable jaws having at least three master jaws being movable radially about a jaw set center line such that said master jaws in said set remain concentrically located about said center line as said jaws grip a part to be machined; and means substantially contained within said side walls for actuating said master jaws.

2. The fixture of claim 1, further comprising:
means for enabling a shaft of relatively long length to pass all the way through said fixture, from one face plate through an opposite face plate.

3. The fixture of claim 1, wherein said means for actuating includes a worm drive gear in contact with a worm wheel; said worm wheel secured to a scroll plate having at least one slot therein, said worm wheel, said worm gear, and said scroll plate being housed within said side wall; and said scroll plate having means for engaging said jaws to open and close said jaws.

4. The of claim 3, further comprising: a bearing sleeve positioned within a through hole of said face plate, said scroll plate, said worm wheel, and said side wall, thereby permitting rotation of said scroll plate and said worm wheel about said bearing sleeve.

5. A positioning fixture for use in holding a part to be machined by a machine tool on a machining center, said machining center of a type having a movable pallet in association therewith, upon said pallet said fixture is placed, for bringing said part held by said fixture into a predetermined position with respect to said machine tool, said fixture comprising: at least three side walls joined in a manner forming a casing; at least one of said side walls having a movable set of jaws secured thereto, said jaw set being movable radially about a center line such that said jaws in said set remain concentrically located about said center line as said jaws grip a part to be machined; means for actuating said jaws to grip a part to be machined wherein said means for actuating includes a worm drive gear in contact with a worm wheel; said worm wheel secured to a scroll plate having at least one slot therein, said worm wheel, said worm gear, and said scroll plate being housed within said side wall; and said scroll plate having means for engaging said jaws to open and close said jaws.

6. The fixture of claim 5, wherein said means for engaging includes at least one pin, one end of said pin movably engaged within said slot in said scroll plate, the other end of said pin engaged within one of said jaws, so that as said scroll plate turns, said pin moves within said slot thereby driving said jaw to close in or open out, depending upon the direction said scroll plate is turning.

7. A positioning fixture for use in holding parts, said fixture comprising: a block made of metal and having a plurality of side walls; at least one set of movable jaws secured to at least one of said side walls, said jaws in said jaw set being movably radially about a jaw set center line such that said jaws in said set remain concentrically located about said center line; each of said jaws in said jaw set movably secured within slots formed in said side wall of said block such that said jaws are prevented from falling out of said side walls while at the same time said jaws are capable of movement in a plane parallel with said side wall of said fixture in said slot; and means for actuating said movable jaws, said means substantially enclosed within cavities formed in said side wall 8. The fixture of claim 7, wherein said means for actuating said jaws includes a worm drive gear which contacts a worm wheel; said worm wheel being secured to a scroll plate; said scroll plate having slots formed in a side opposite said worm wheel; said worm wheel and said scroll plate being annularly configured about a bearing sleeve, said bearing sleeve disposed within said through hole.

9. The fixture of claim 7, wherein said means for actuating said jaws includes a rack drive gear which contacts a spur gear; said spur gear being secured to a scroll plate; said scroll plate having slots formed in a side opposite said spur gear; said spur gear and said scroll plate being annularly configured about a bearing sleeve, said bearing sleeve disposed within said through hole.

10. The fixture of claim 8, further comprising:
pins movably engaged at one end thereof within said slots of said scroll plate, the other end of said pins engaged within said jaws so that a said scroll plate is turned said pins are moved in or out, with respect to said through hole, depending upon the direction said scroll plate is turned, resulting in said jaws moving in or out.

11. The fixture of claim 9, further comprising:
pins movably engaged at one end thereof within said slots of said scroll plate, the other end of said pins engaged within said jaws so that as said scroll plate is turned said pins are moved in or out, with respect to said through hole, depending upon the direction said scroll plate is turned, resulting in said jaws moving in or out.

12. A fixture for use with a machining center, said fixture comprising:
an interior casing comprised of a plurality of side walls;
face plates mounted flush to exterior surfaces of said walls, said face plates and said walls having a plurality of through holes therein for housing shafts of parts to be machined by said machining center;
a plurality of jaw sets having work jaws exposed on an exterior surface of said face plates and positioned about said through holes, said jaws being actuated by an assembly substantially positioned within said walls;
said assembly comprising a worm drive gear contacting a worm wheel, said worm wheel being secured to one side of a scroll plate, another side of said scroll plate having slots formed therein, pins movably engaged within said slots at one end of said pins and another end of said pins being engaged within said jaws, such that as said worm drive gear is turned, said worm drive gear drives said worm wheel and as said worm wheel turns, said scroll plate being secured to said worm wheel turns with said worm wheel, said slots in said scroll plate are tapered in such a fashion that as said scroll plate is turned, said pins will move in said slots thereby driving said jaws in toward said through hole or outward in a direction away from said through hole depending upon the direction said scroll wheel is turning;
said scroll plate and said worm wheel are disposed about a bearing sleeve, said bearing sleeve being secured within said through hole;

said walls having recessed areas formed therein for housing said scroll plate, said worm wheel, and said worm drive gear; and said face plates having means formed therein for enabling said worm drive gear to be turned.

13. A fixture for use with a machining center, said fixture comprising:

an interior casing comprised of a plurality of side walls;

face plates mounted flush to exterior surfaces of said walls, said face plates and said walls having a plurality of through holes therein for housing shafts of parts to be machined by said machining center;

a plurality of jaw sets having work jaws exposed on an exterior surface of said face plates and positioned about said through holes, said jaws being actuated by an assembly substantially positioned within said walls;

said assembly comprising a rack drive gear contacting a spur gear, said spur gear being secured to one side of a scroll plate, another side of said scroll plate having at least one slot formed therein, at least one pin movably engaged within said slot at one end of said pin and the other end of said pin engaged within one of said jaws, such that as said rack drive gear is moved, said rack drive gear drives said spur gear and as said spur gear turns, said scroll plate being secured to said spur gear also turns, said slot in said scroll plate is tapered so that as said scroll plate turns, said pin will move in said slot thereby driving said jaws in toward said through hole or out in a direction away from said through hole depending upon the direction said scroll wheel is turning;

said scroll plate and said spur gear are disposed about a bearing sleeve, said bearing sleeve being secured within said through hole;

said walls having recessed areas formed therein for housing said scroll plate, said spur gear, and said rack drive gear; and means for enabling said rack drive gear to be actuated.

14. A positioning fixture for holding parts to be machined on a horizontal machining center, said fixture comprising: four side walls joined in a manner forming a casing; each of said side walls having a movable set of jaws secured thereto, each of said jaw sets having its own center line and said jaws in each of said sets being movable radially about its respective said center line such that said jaws in each of said sets remain concentrically located about respective said center lines as said jaws grip said parts to be machined; said casing secured to a movable pallet to enable said fixture to be brought into a predetermined position with respect to a machine tool on said machining center; means for independently actuating said sets of jaws, said actuating means including a rack drive gear in contact with a spur gear, said rack drive movable linearly by pressure exerted on an end of said rack drive, said pressure induced by a hydraulic system; said spur gear secured to a scroll plate having means for opening and closing said jaws as said rack drive turns said spur gear which in turn causes said scroll plate to turn; and said hydraulic system controlled by electronic means.

15. The fixture of claim 14, wherein said means associated with said scroll plate for opening and closing said jaws comprises at least one slot formed in a side of said scroll plate for accepting an end of at least one pin, another end of said pin engaged within one of said jaws, so that as said scroll plate turns, said pin moves within said slots thereby driving said jaw to close in or open out, depending upon the direction said scroll plate is turning.

16. A positioning fixture for holding parts to be machined on a horizontal machining center, said fixture comprising: four side walls joined in a manner forming a casing; each of said side walls having a movable set of jaws secured thereto, each of said jaw sets having its own center line and said jaws in each of said sets being movably radially about its respective said center line such that said jaws in each of said sets remain concentrically located about respective said center lines as said jaws grip said parts to be machined; said casing secured to a movable pallet to enable said fixture to be brought into a predetermined position with respect to a machine tool on said machining center; and means for independently actuating each of said jaw sets which includes a worm drive gear in contact with a worm wheel wherein said worm drive gear and said worm wheel are housed within said side walls.

* * * * *